United States Patent [19]

Kamens

[11] Patent Number: 4,912,692

[45] Date of Patent: Mar. 27, 1990

[54] HIGH RATE, BIDIRECTIONAL DRIVE FOR A BIPOLE STEPPING MOTOR WATCH

[75] Inventor: Bruce Kamens, Thomaston, Conn.

[73] Assignee: Timex Corporation, Waterbury, Conn.

[21] Appl. No.: 250,649

[22] Filed: Sep. 29, 1988

[51] Int. Cl.[4] ............................ G06F 1/04; G04F 5/00

[52] U.S. Cl. .................................... 368/157; 368/160; 368/185; 318/696

[58] Field of Search ........................ 368/157, 160, 185; 318/696

[56] References Cited

U.S. PATENT DOCUMENTS

| | | | |
|---|---|---|---|
| 4,055,785 | 10/1977 | Nakajima et al. | 318/138 |
| 4,112,671 | 9/1978 | Kato et al. | 368/162 |
| 4,150,536 | 4/1979 | Nakajima et al. | 368/155 |
| 4,205,262 | 5/1980 | Shida | 318/696 |
| 4,358,840 | 11/1982 | Ono et al. | 368/251 |
| 4,361,410 | 11/1982 | Nakajima et al. | 368/157 |
| 4,375,049 | 2/1983 | Grand Chivan | 318/696 |
| 4,479,723 | 10/1984 | Shida | 368/157 |
| 4,550,279 | 10/1985 | Klein | 368/157 |
| 4,633,156 | 12/1986 | Besson et al. | 368/157 |

*Primary Examiner*—Bernard Roskoski
*Attorney, Agent, or Firm*—William C. Crutcher

[57] ABSTRACT

An improved drive circuit for a quartz analog wristwatch having a bipole stepping motor with a drive coil, a power supply, a gear train having a plurality of gears driven by the rotor, a plurality of output members with hands rotatably driven by said gears, the rotor, gears, output members and hands together comprising a rotating system, wherein the improvement comprises a low impedance drive coil, first circuit means arrange to generate periodic pulses of alternating polarity at a normal timekeeping frequency, second circuit means arranged to supply successive drive pulses of alternating polarity to the coil at an intermediate frequency on the order of 300 to 600 pulses per second selected to sustain and synchronize the rotating system at a substantially constant angular velocity, and third circuit means arranged to modulate the periodic pulses generated by the first circuit means so as to chop them at a high frequency on the order of 4 kilohertz at a 25 to 50 percent duty cycle selected with regard to the low impedance coil, so that energy which would otherwise be consumed by the coil is reduced during normal timekeeping. A braking pulse of 22 to 30 milliseconds in duration is applied to stop the high speed rotating system at the conclusion of time setting.

7 Claims, 3 Drawing Sheets

HIGH RATE, BIDIRECTIONAL DRIVE FOR A BIPOLE STEPPING MOTOR WATCH

This invention relates generally to drive circuits for quartz analog wristwatches having a bipole stepping motor. More particularly, the invention relates to a high rate, bidirectional drive circuit for setting quartz analog wristwatches which is particularly suitable for three-hand watches.

Bipole stepping motors or Lavet stepping motors commonly used in quartz analog wristwatches are normally driven in discrete steps with the motor coming to rest between successive steps. With a bipole stepping motor, the rotor is commonly supplied with a pulse applied to the driving coil, which causes the rotor to rotate ½ revolution, and this is transmitted through a gear train to cause the "seconds" hand to step 1/60 revolution. The "seconds" hand is also connected to drive the "minutes" hand and the "hours" hand through the gear train. Subsequently, after an interval of one second, the polarity of the driving pulse is reversed and applied to rotate the stepping motor rotor another ½ revolution, and so forth. Because the rotor undergoes a damped oscillation after each step, application of pulses of alternating polarity at a higher frequency for setting the hands is limited to approximately 60 steps a second.

It is also useful when setting a wristwatch to apply driving pulses in which a manner as to cause the hands to rotate in reverse of the normal direction. It is known from U.S. Pat. No. 4,205,262 issued May 27, 1980 to Shida, that a short reverse polarity pulse may be applied to the coil just before the normal pulse in order to initiate rotation of the stepping rotor in a reverse direction, whereupon the polarity is reversed forward during the remainder of the pulse, which causes the rotor to continue in the reverse direction until it reaches a rest position to complete the step.

It is also known from U.S. Pat. No. 4,375,049 issued Feb. 22, 1983 to Grand Chivan and assigned to applicant's assignee, to first "rock" the rotor in a forward direction by applying a forward pulse comprising a train of high frequency pulses and then to reverse direction of rotation by reversing polarity and applying a reversing pulse portion.

It is known from U.S. Pat. No. 4,357,693 issued Nov. 2, 1982 to Plancon et al. and assigned to Applicant's assignee that a stepping motor of an analog watch can be driven with normal timekeeping signals and alternately supplied with higher frequency pulses and operated at an accelerated rate either in the clockwise or counterclockwise directions to step the motor at a higher speed for the purpose of setting the wristwatch or correcting for time zone changes.

High-speed forward stepping and high-speed reverse stepping are also disclosed in U.S. Pat. No. 4,112,671-Kato issued Sept. 12, 1978; U.S. Pat. No. 4,358,840 issued Nov. 9, 1982 to Ono et al. and in U.S. Pat. No. 4,150,536 issued Apr. 24, 1979 to Nakajima et al.

As a substitute for a single unmodulated pulse of predetermined duration and amplitude, it is known to modulate the driving pulse to form a train of high frequency pulses in lieu of a single pulse for a variety of reasons. In U.S. Pat. No. 4,361,410, issued Nov. 30, 1982 to Nakajima et al., alternating drive pulses are shown as modulated by a one kilohertz signal at duty cycles of fifty percent or more for the purpose of reducing power consumption and manufacturing costs of the stepping motor. In U.S. Pat. No. 4,479,723 issued Oct. 30, 1984 to Shida, the drive pulses are similarly modulated at the end of the cycle to reduce the energy to the drive coil to prevent reversal of the motor and ensure completion of the step. In U.S. Pat. No. 4,055,785 issued Oct. 25, 1977 to Nakajima et al., a "burst" of high frequency pulses at a frequency greater than 100 hertz are supplied at a 50 percent duty cycle to reduce coil current and flux intensity for shifting the static equilibrium position of the rotor in order to reverse it.

In all of the foregoing prior art, the rotor steps forward or reverse in discrete steps, at a normal timekeeping rate, or at a higher rate in discrete steps for the purpose of setting the wristwatch. The higher rate is limited due to the need for the rotor stabilize at its equilibrium position after each step. It would be desirable to operate the stepping motor in order to set the watch by electrical means at much higher speeds, particularly in the case of a three-hand wristwatch. The only alternative is to employ a manual crown and setting gear mechanism which increases the cost of the watch.

Accordingly, one object of the present invention is to provide an improved high rate, bidirectional drive circuit for a bipole stepping motor.

Another object of the invention is to provide a drive circuit with an improved wave form for operating a quartz analog wristwatch during normal timekeeping and for setting, both in forward and reverse directions.

DRAWING

The invention, both as to organization and method of practice, together with further objects and advantages thereof, may best be understood by reference to the following specifications, taken inconnection with the accompanying drawings, in which:

FIG. 1 is a simplified schematic diagram of a three-hand quartz analog watch movement with bipole stepping motor and driving circuit, while FIG. 1*a* is a more descriptive block diagram of the driving circuit itself, FIG. 2 consisting of FIGS. 2(*a*) through 2(*e*) are wave form diagrams of prior art wave shapes applied to the stepping motor coil, FIG. 3 is a wave form diagram of voltage applied by closing the setting switch to the integrated circuit, FIG. 3*a* showing fast forward, 3*b* showing fast reverse, and 3*c* showing the stopping mode with braking, FIG. 4 is a wave form diagram illustrating timekeeping pulses and forward high rate drive pulses according to the present invention, FIG. 5 is a wave form diagram illustrating normal timekeeping pulses and reverse high rate drive pulses according to the present invention, FIG. 6 is a simplified schematic diagram of the stepping motor and the gear train.

SUMMARY OF THE INVENTION

Briefly stated, the invention comprises an improvement to the drive circuit of a quartz analog wristwatch having a stepping motor with a drive coil, a gear train having a plurality of gears driven by the rotor, a plurality of output members with hands rotatably driven by said gears, the rotor, gears, output members and hands together comprising a rotating system, wherein the improvement comprises a low impedance driven coil, first circuit means arranged to generate periodic pulses of alternating polarity at a normal timekeeping frequency, second circuit means arranged to supply sucessive drive pulses of alternating polarity to the coil at an intermediate frequency selected to sustain and synchronize the rotating system at a substantially constant angular velocity, and third circuit means arranged to modulate the periodic pulses generated by the first circuit means so as to chop them at a high frequency selected with regard to the low impedance coil, so that energy which would otherwise be consumed by the coil is reduced during normal timekeeping.

In its preferred form, the periodic pulses are provided at one second intervals, the intermediate frequency of successive drive pulses is on the order of 300 to 600 pulses per second, and the timekeeping pulse is chopped at a four kilohertz rate having a 25 to 50 percent duty cycle. A braking pulse of 22 to 30 milliseconds in duration may be applied to stop the high speed rotating system at the conclusion of time setting.

DESCRIPTION OF THE PREFERRED EMBODIMENT

Figure 1:
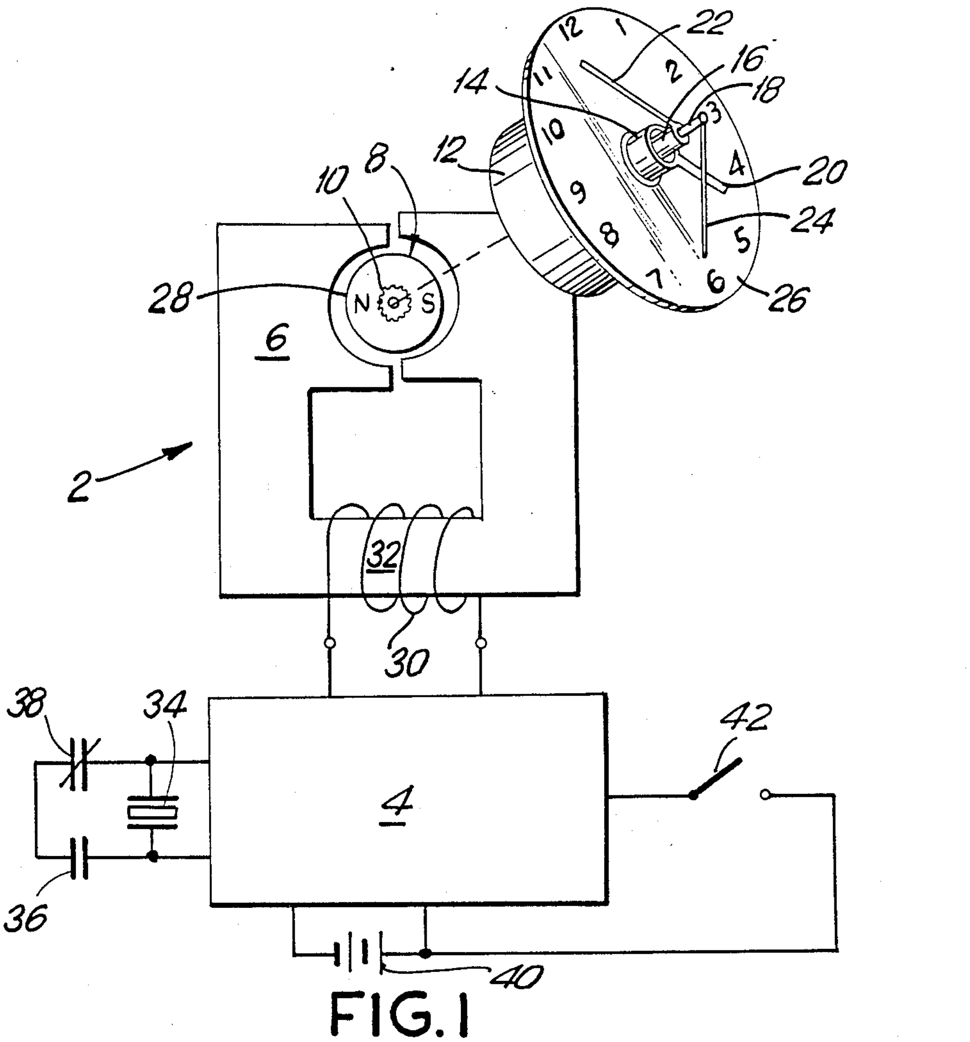
Figure 5:
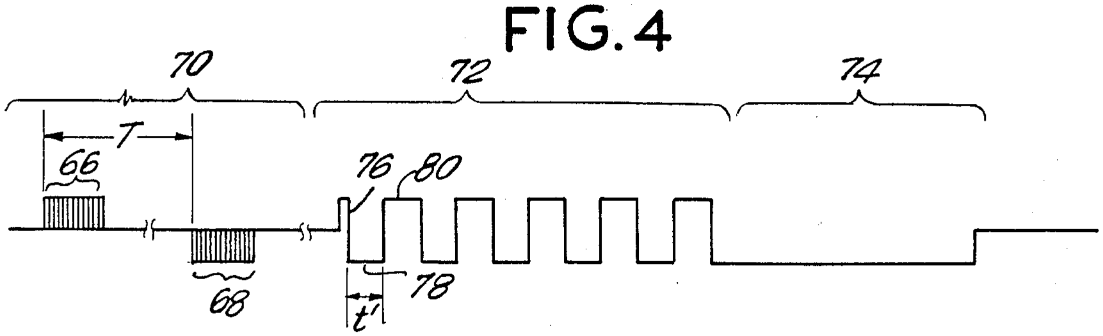
Figure 6:
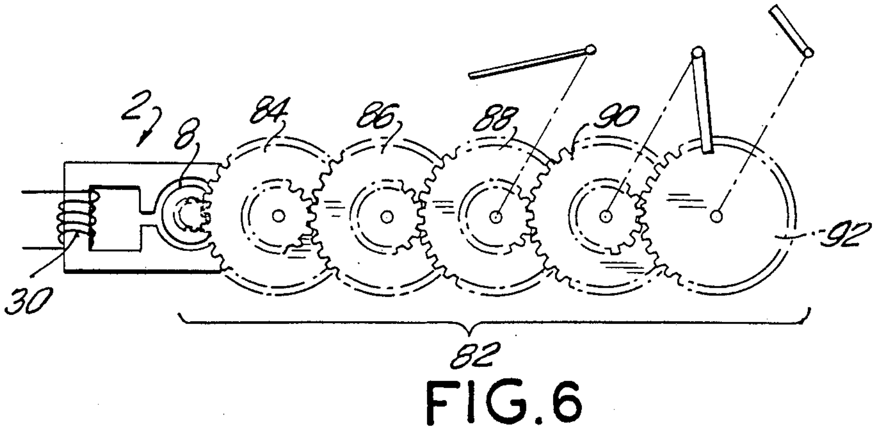

Referring to FIG. 1 and FIG. 5 of the drawing, a simplified schematic view of a quartz analog wristwatch movement is illustrated, the various components being not to scale and drawn to illustrate their function rather than actual shape or size. The movement includes a stepping motor 2 supplied with drive pulses by an integrated circuit 4. The stepping motor includes a stator 6 and rotor 8 rotatably mounted within the watch frame (not shown). Rotor 8 is mechanically coupled via its pinion 10 to a plurality of gears comprising a gear train collectively illustrated at 12. Selected gears are associated with coaxial rotatable output members 14, 16, 18 which respectively "step" or rotate an "hour" hand 20, "minute" hand 22 and "second" hand 24. The hands indicate time by means of a watch dial 26. The rotor 8, gears, output members and hands together constitute a rotating system 82 (FIG. 6).

The stepping motor rotor 8 includes a bipole permanent magnet 28 cooperating with stator 6 in a manner well known to those skilled in the art by means periodically reversing the direction of current through a coil 30 wound around a core 32 of the stator.

Figure 1A:
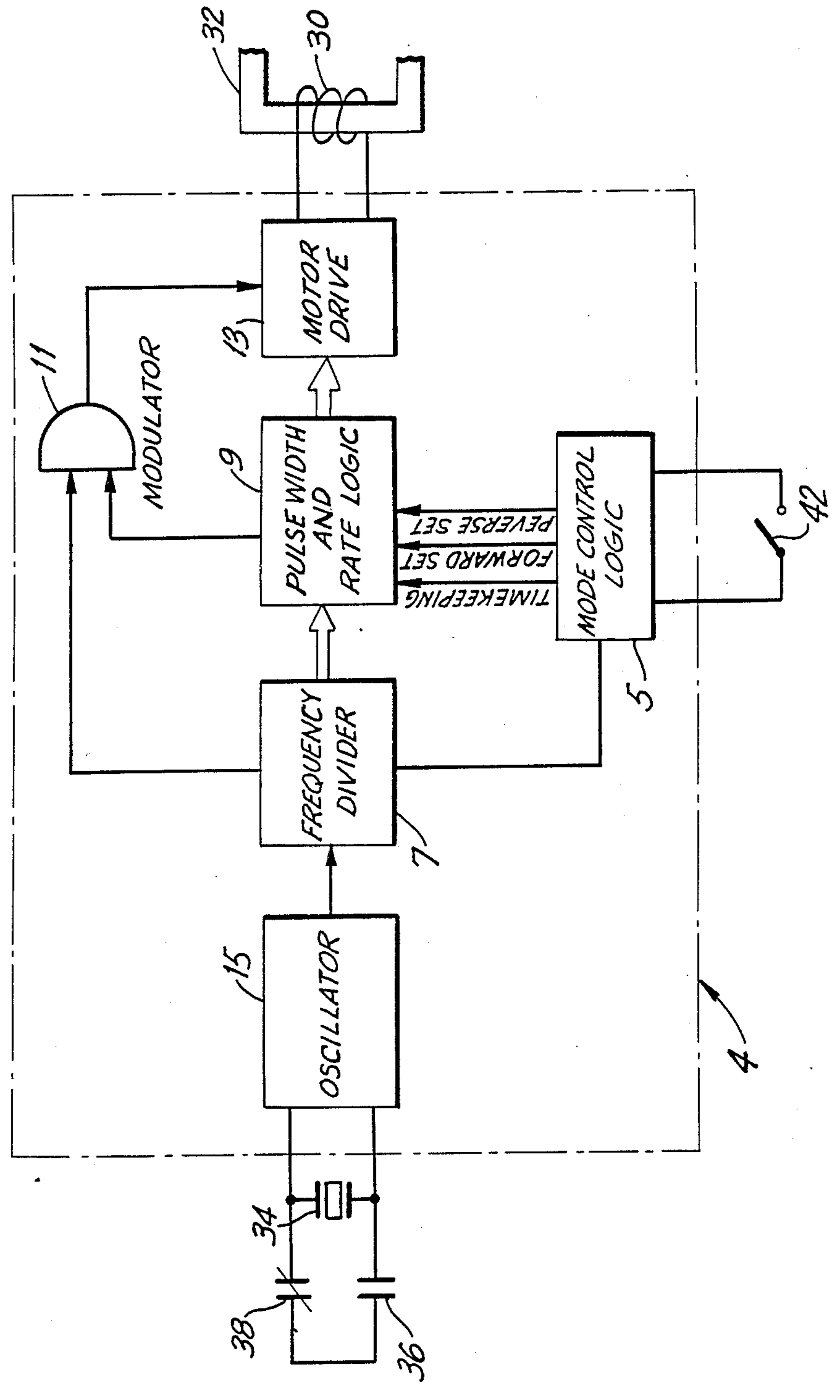
Figure 3:
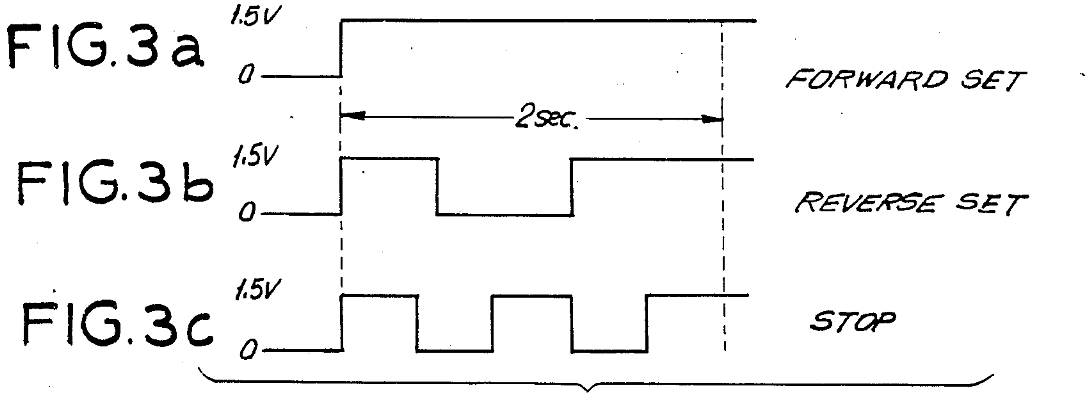

Integrated circuit 4 is disposed on a circuit board together with a quartz crystal timebase 34, capacitors 36, 38 and is connectible to an energy cell 40 which is a button-type battery also disposed in the watchbase. The integrated circuit 4 is also connected to a manually actuated switch 42 which is operated by a button or crown protruding from the watchbase. This button is operated in a manner to be described to select one of three operating modes: normal timekeeping, forward set, or reverse set. Refer to FIG. 3 and FIG. 1*a*.

Integrated circuit 4 may either be customized to provide the drive pulses to be described, or it may be a programmable microcomputer chip, which has been mask-programmed to provide the drive pulse wave forms to be described. The design and programming of such an integrated circuit is well known to those skilled in the art and the description provided herein is sufficient to design such a circuit without illustration of the logic elements which might be utilized to generate and supply the wave forms to be described. Such a circuit is shown in simplified block diagram form in FIG. 1*a*.

The integrated circuit 4 includes a conventional oscillator 15, which together with an external quartz crystal timebase 34 and external capacitors 36, 38, generates a high frequency reference master clock to a frequency divider 7. The frequency divider 7 then generates a mode control clock to a mode control logic 5, a modulating waveform to a modulator 11, and timekeeping, fast forward and fast reverse waveforms to the pulse width and rate logic 9. The oscillator 15 and frequency divider 7 constitute first circuit means arranged to generate periodic pulses of alternating polarity at a normal timekeeping frequency. The model control logic 5 operates with switch 42 to control the pulse width and rate logic 9 and motor drive 13. These elements which allow the manual selection of the intermediate frequency drive waveforms (forward set and reverse set), comprise the second circuit means of this application. The manual selector 42 and mode control logic 5 supply the braking pulse to the motor drive and comprise the fourth circuit means of this application. This braking pulse resets the wristwatch to normal timekeeping operation during which periodic pulses generated by first circuit means are "chopped" by modulator 11 at a high frequency to supply a pulse train of chopped pulses to motor drive 13 which in turn drive said low impedance drive coil 30. The modulator 11, motor drives 13, and low impedance drive coil 30 comprise the third circuit means of this application.

In accordance with the present invention, the coil 30 is designed to have a significantly lower impedance than prior art coils for stepping motors. This is done by reducing the number of turns and increasing the cross-sectional area of the wire. The coil impedance is a complex value which depends upon the varying inductance (dependent upon rotor position in the stator) and upon the wave form and frequency of applied pulses. Typically the coil is supplied with periodic alternating square pulses at a rate of 1 pulse per second with amplitude of 1.5 volts and duration of 6.0 ms. A conventional stepping motor coil designed to operate under these conditions might contain around 10,000 turns and have a resistance of 2500 ohms. The low impedance coil for the same motor according to the present invention would have between 4,000 and 8,000 turns and a resistance in the range of 500 ohms to 1500 ohms. A satisfactory motor coil would have, as an example, 6,300 turns with a resistance of 1000 ohms.

Figure 2:
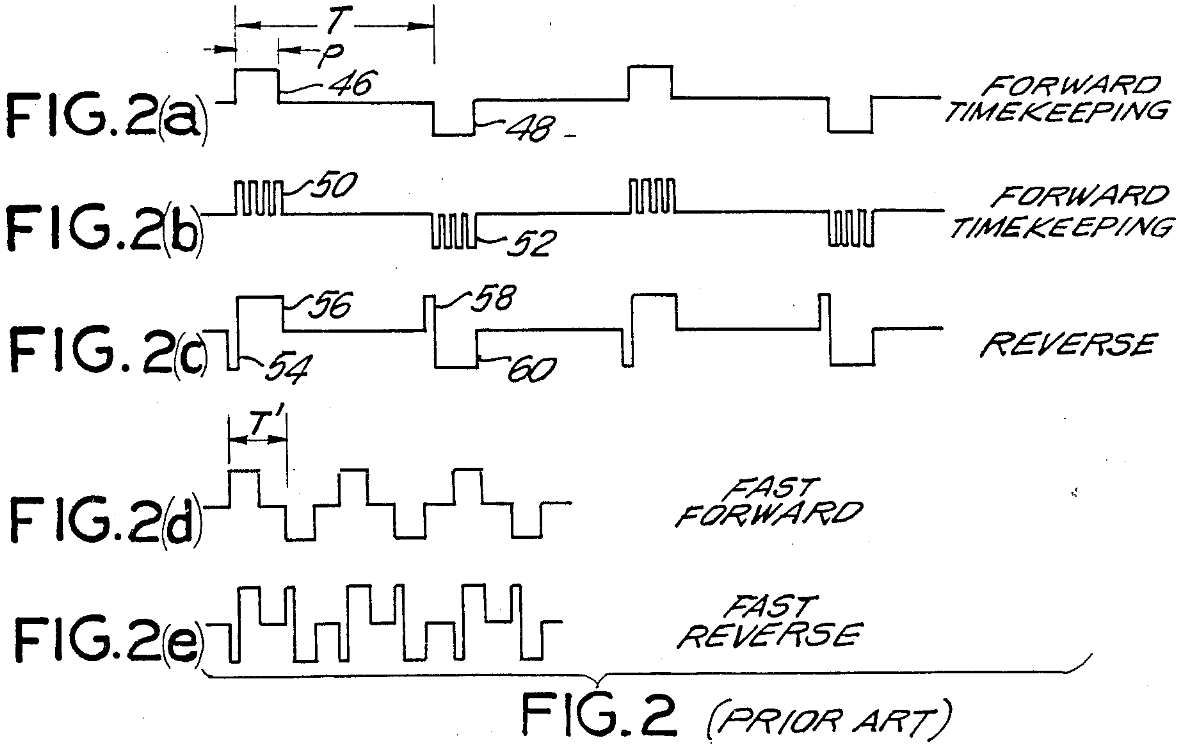
FIG. 2 (PRIOR ART)

Referring to FIG. 2 of the drawing, a series of wave forms (a) and through (e) illustrates typical prior art wave forms. FIG. 2(*a*) is a typical wave form for supplying periodic drive pulses of a duration "P", for example of, 6.0 ms at a normal timekeeping frequency over a period of "T". The pulses alternate in polarity as indicated at 46, 48 and are supplied periodically, Periodically is defined herein as including an active pulse followed by a period of time in which a braking pulse or no pulse is applied, in order to allow the rotor to stabilize before applying the next active pulse.

It is also known in the prior art as illustrated at 2(*b*) that a pulse of constant amplitude may be modulated or "chopped" at a high frequency to provide a first train 50 of high frequency pulses of one polarity and a second train 52 of high frequency pulses of opposite polarity, such trains of pulses providing a lower current in a conventional stepping motor coil. The trains 50, 52 are applied periodically, i.e. with a rest time or braking pulse between trains of pulses.

FIG. 2(*c*) illustrates a known rotor reversing wave form discussed, for example, in U.S. Pat. No. 4,205,262, Shida, wherein a short reverse polarity phase portion 54 is applied to the coil just before a normal forward pulse portion 56, which steps the watch hands in a reverse direction. After a stabilizing time, as in FIGS. 2(*a*), 2(*b*), the pattern of the wave form is then reversed to provide a short "reverse" pulse portion 58 to the coil followed by a normal "forward" pulse portion 60, it being understood that the rotor is, again stepped ½ revolution in reverse. This reverse mode continues at a normal timekeeping frequency with period T, if desired.

FIGS. 2(*d*) and 2(*e*) illustrates similar forward and reverse wave forms for supplying "fast forward" and "fast reverse" in accordance with the prior art. The wave shapes alternate in polarity as described in connection with those above, except they are applied periodically at a higher frequency with a period T'. The rotor advances the gear train step-by-step at the higher frequency, but coming to rest between each step. Due to oscillation of the rotor, this mode of operation is limited to approximately 60 steps per second, where T' is equal to 1/60 or 16.7 ms.

Referring to FIG. 3 and FIG. 1*a* of the drawing, setting of the timepiece is accomplished by appropriate actuation of switch 42 by pressing an external pushbutton within a two second time interval. This applies battery voltage to the mode control logic 5 in accordance with a preselected pattern to terminate timekeeping and to initiate fast forward setting, fast reverse setting, and stopping the hands to re-commence normal timekeeping.

In FIG. 3*a* the switch 42 is closed for more than two seconds to terminate normal periodic timekeeping pulses by first circuit means and to initiate successive alternating pulses at an intermediate frequency by second circuit means.

In FIG. 3*b*, the switch 43 is closed once, opened and then re-closed within 2 seconds to initiate fast reverse rotation in a manner to be described. Opening switch 42 re-commences normal timekeeping.

In FIG. 3*c* the switch 42 is closed and reopened twice within 2 seconds and then closed to initiate the stop or braking mode. Reopening switch 42 re-commences normal timekeeping.

Other patterns or additional switches may be employed to accomplish the same results.

Figure 4:
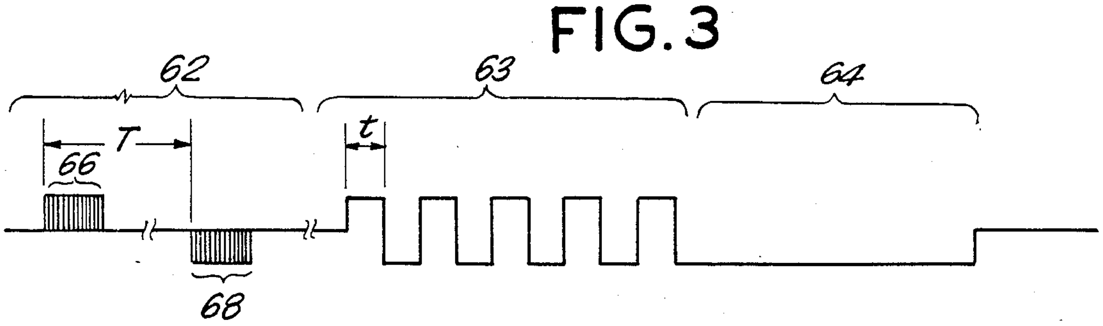

Referring now to FIG. 4 of the drawing, wave forms are illustrated for normal timekeeping 62, fast-forward 63, and braking pulse 64 at the end of the fat-forward sequence.

First referring to normal timekeeping, the low impedance coil 30 of FIG. 1 is supplied by integrated circuit 4 with a first train 66 of high frequency pulses and after the rotor stabilizes is supplied with a second train 68 of high frequency pulses of opposite polarity. Pulse trains 66, 68 are preferably of a duration of approximately 6.0 ms and supplied periodically at a normal timekeeping frequency of once per second having a period T of one second.

In accordance with the present invention, the pulse trains 66, 68 are provided by designing integrated circuit 4 to include first circuit means which periodically generate constant amplitude pulses of alternating polarity at normal timekeeping frequency and then modulating or "chopping" the pulses generated by the first circuit means. The modulation is provided by third circuit means with a selected high frequency modulating signal preferably on the order of 4 kilohertz and having a 20 to 25 percent duty cycle. Depending upon the particular watch design and drive requirements, the modulating frequency selected may vary between 2 kilohertz and 8 kilohertz. The modulating frequency, duty cycle and length of pulse trains 66, 68 are selected with regard to the impedance of coil 30 so as to step the rotor 8 once per second in the normal manner without consuming excessive energy during normal timekeeping.

In accordance with the present invention the integrated circuit is further designed to include second circuit means to generate successive drive pulses of alternating polarity and to supply them to the coil 30. Successive drive pulses are defined herein as alternating between one polarity and the opposite polarity without a null or braking pulse i.e., at a 100 percent duty cycle. The selection of the intermediate frequency is highly empirical and is preferably determined by experimentation, since it depends upon the mechanical characteristics and design of the stepping motor, gear train, arrangement of the output members and their attached hands, i.e., upon the rotational moment of inertia, friction and overall arrangement of the rotating system. The intermediate frequency for the successive drive pulses for a particular three-hand watch of the assignee's manufacture may be on the order of 300 to 600 pulses per second, a pulse being defined as having a period t of between 1.7 and 3.3 ms. The pulse width t is selected to coincide with the time required for the stepping motor rotor to complete ½ revolution when the rotating system is rotating at high speed, so that each successive pulse will synchronize and sustain the rotating system at a substantially constant angular velocity without deceleration between successive drive pulses.

The successive drive pulses for high rate time setting are initiated by actuating switch 42 in the manner shown in FIG. 3*a*, by pushing and holding a button on the time piece to set the watch at a high speed in a forward direction. At the desired termination of the high speed time setting, the switch 42 is acutated in the manner shown in FIG. 3*c* by pushing the button twice in a two second interval. The integrated circuit is designed or programmed for providing fourth circuit means to generate a braking pulse, comprising a unipolarity constant pulse shown over time period 64, preferably of 20 to 30 ms in duration. This long braking pulse provides a braking action on the rotor and also assures proper phasing of the rotor for subsequent forward normal timekeeping pulses.

Reference to FIG. 5 illustrates a similar wave form for reversing the watch hands from forward direction at a normal timekeeping frequency illustrated by graph portion 70, to turn in the opposite direction at a high rate reverse drive illustrated by graph portion 72, and to stop the hands with a braking pulse shown in graph portion 74. Normal timekeeping consists of alternating polarity pulses applied periodically and modulated at a high frequency as discussed in connection with FIG. 4. High rate reverse timesetting is initiated by manually actuated switch 42 in the manner shown in FIG. 3*b* by pressing the button, releasing and then pressing and holding within a 2 second interval. The first action of the circuit in accordance with the present invention, consists of application of a short "forward" pulse 76 which pre-positions the rotor from its rest position by rocking it in a forward direction, followed by a reverse pulse 78 and successive pulses 80, etc., of alternating polarity and duration t'. The intermediate frequency which is selected to sustain and synchronize the rotating system at a substantially constant angular velocity in reverse is, again, best selected empirically by experimentation, but typical intermediate frequencies fall within the range of 300 to 600 pulses per second. Since it is quite possible that the mechanical characteristics of the rotating system are different in a reverse direction from those in a forward direction, the intermediate frequency for forward high rate drive may not be the same as the preferred intermediate frequency for reverse high rate drive.

At the end of reverse timesetting at a high rate, a braking pulse 74 is applied as before to halt the reverse rotation and position the rotor for receipt of the first normal timekeeping pulse train 66, as before.

FIG. 6 of the drawing is a simplified schematic diagram of a rotating system 82 driven by the stepping motor 2, it being understood that the rotating system varies from one type of watch to the next. FIG. 6 is simplified and does not show the gear members in the actual positions which they occupy inside the timepiece movement. Stepping motor rotor 8 drives a first gear and pinion 84 which drives a second gear and pinion 86 which drives a "seconds" wheel 88 for the seconds hand, "minutes" wheel assembly 90 for the minutes hand and "hours" wheel assembly 92 for the hours hand. The output members for the gears 88, 90, 92 would normally be arranged coaxially with one another rather than as shown schematically in FIG. 6.

The invention permits high speed forward and reverse setting using successive pulses of alternating polarity at an intermediate frequency applied to a low impedance coil which will sustain rotation at a constant angular velocity. Since the low impedance coil would consume excessive energy if supplied with normal constant amplitude periodic drive pulses during normal timekeeping, the high frequency modulation of the periodic pulses permits the use of a low impedance coil without excessive energy consumption.

While the intermediate frequency may be calculated from the circuit equation and the equation of motion which includes the rotating system moment or inertia and other known characteristics of the rotating system 82, it is preferable to determine the intermediate frequency empirically because of the many variables and complexity of such a rotating system.

While there has been described what is considered to be the preferred embodiment of the invention, other modifications will occur to those skilled in the art and it is desired to secure in the appended claims all such modifications as fall within the true spirit and the scope of the invention.

I claim:

1. In a quartz analog wristwatch having a manually attached switch and having a bipole stepping motor with a rotor and a drive coil, a power supply, a gear train having a plurality of gears driven by said rotor, a plurality of output members with hands rotatably driven by said gears, said rotor, gears, output members and hands together comprising a rotating system, and an integrated circuit connected to said power supply and supplying drive pulses to said coil, the improvement comprising:

first circuit means arranged to generate periodic pulses of alternating polarity at a normal timekeeping frequency, second circuit means responsive to said manually actuated switch and arranged to generate and supply successive drive pulses of alternating polarity to said coil at an intermediate frequency selected to sustain and synchronize said rotating system at a substantially constant angular velocity, and third circuit means arranged to modulate said periodic pulses generated by said first circuit means to chop said periodic pulses at a high frequency and to supply a pulse train of said chopped pulses to said drive coil, said drive coil having a low impedance selected with respect to said pulse train, whereby energy which would otherwise be consumed by said low impedance coil is reduced during normal timekeeping, said low impedance drive coil having between 4000 and 8000 turns and a resistance in the range of 500 ohms and 1500 ohms.

2. The combination according to claim 1, wherein said high frequency is on the order of 4 kilohertz and wherein said periodic pulses are modulated with a duty cycle between 25 and 50 percent.

3. The combination according to claim 1, wherein said intermediate frequency is selected to provide said successive pulses at an intermediate frequency in a range between 300 and 600 pulses per second.

4. The combination according to claim 1, wherein said second circuit means is further adapted to supply a short pre-positioning pulse of polarity and duration selected to rock said rotor in a forward direction and subsequently to supply said successive drive pulses to cause said rotating system to rotate in a reverse direction at a substantially constant angular velocity.

5. The combination according to claim 1, including fourth circuit means arrangd to supply a braking pulse with a duration on the order of 20 to 30 ms, whereby said rotating system is caused to stop rotating, said braking pulse being of a plurality selected to position said rotor for a subsequent forward pulse train supplied by said third circuit means.

6. The combination according to claim 1, including wherein said second circuit means is activated by closing said manually actuated switch and wherein said first and third circuit means are activated by reopening said manually actuated switch.

7. The combination according to claim 6, wherein said second circuit means is further adapted to reverse the direction of rotation by opening and closing said manually actuated switch in a predetermined manner within a preselected time interval.

* * * * *